United States Patent [19]
Bar

[11] 4,319,712
[45] Mar. 16, 1982

[54] ENERGY UTILIZATION REDUCTION DEVICES

[76] Inventor: Ofer Bar, 12 Nordau St., Ashdod, Israel

[21] Appl. No.: 144,551

[22] Filed: Apr. 28, 1980

[51] Int. Cl.³ .................. G05D 23/00; F25D 17/00
[52] U.S. Cl. ............................... 236/47; 62/180; 165/11 R; 335/205
[58] Field of Search ............... 236/47, 1; 62/180, 161, 62/163; 165/11; 335/205

[56] References Cited
U.S. PATENT DOCUMENTS

| | | | |
|---|---|---|---|
| 3,012,116 | 12/1961 | Boylan et al. | 335/205 |
| 4,060,123 | 11/1977 | Hoffman et al. | 165/11 |
| 4,107,941 | 8/1978 | Hamilton | 62/180 |
| 4,232,819 | 11/1980 | Bost | 62/158 X |

*Primary Examiner*—William E. Wayner
*Attorney, Agent, or Firm*—Morgan, Finnegan, Pine, Foley & Lee

[57] ABSTRACT

An energy conservation arrangement for a hotel guest room or other room lockable by a key (26) comprises a key reception module (10) disposed inside the room to receive a tag (24) of the key when the guest enters the room. Control means (12) is responsive to the tag (24) being received by the key reception module (10) to enable the use of room light(s) (16) and electrical power outlet(s) (18) and to allow a room air conditioner (20) to function normally. When the guest removes the tag (24) from the key reception module (10) prior to leaving the room, the control means (12) disables use of the light(s) (16) and power outlet(s) (18) and puts the air conditioner (20) into a minimum power consumption mode.

7 Claims, 3 Drawing Figures

ENERGY UTILIZATION REDUCTION DEVICES

BACKGROUND OF THE INVENTION

1. Field of the Invention

This invention relates to energy utilization reduction devices.

2. Description of the Prior Art

A large amount of energy is wasted in hotels, public buildings, offices, schools, laboratories and so forth by users (e.g. hotel guests) leaving lights and/or power-consuming electrical appliances switched on when leaving their rooms and by leaving their air conditioners (i.e. heating and/or cooling appliances) set at an unnecessarily high cooling or heating level when leaving their rooms. It has been proposed that power be conserved in a hotel by on/off switching of room heating appliances from a central location, namely the reception desk. Such a system relies upon the guest notifying reception when he leaves his room. Moreover, it only enables on/off control of heating, which is unsatisfactory in cold climates in that unheated rooms can quickly become excessively cold, and inapplicable in warm climates where cooling rather than heating is needed. Moreover, such system does not enable the conservation of power by ensuring that lights and power-consuming appliances (e.g. television receivers) are switched off whenever a guest leaves his room.

There therefore exists a need for an electrical energy conservation arrangement which simply and reliably ensures that when a person leaves a hotel room, or other room that will normally be locked when vacated, the electrical power consuming equipment within that room will be put into a minimal power consumption mode.

SUMMARY OF THE INVENTION

According to the present invention there is provided an energy conservation arrangement for a room lockable by means of a key. The arrangement comprises key reception means located or capable of being located in the room and capable of receiving the key or a tag of the key, the key reception means being operative to indicate whether or not the key or tag is received thereby. The arrangement further comprises control means responsive to the indication provided by the key reception means to fully enable operation of power-consuming equipment in the room when the key or tag is received by the key reception means and to limit the operation of such equipment when the key or tag is not received by the key reception means.

With an arrangement in accordance with the invention, when a person enters the room he will position his key so that the key or tag is received by the key reception means, whereupon he is free to use all the power-consuming equipment. When he wishes to leave the room, he removes the key or tag from the key reception means, whereupon the operation of the equipment is automatically and immediately limited to conserve power until the room is re-occupied. The person using the room is therefore more or less forced to use the arrangement, since he will normally wish to take the key with him when he leaves the room. Moreover, operation of the arrangement is very simple and requires no special ability and no technical knowledge.

In a preferred embodiment of the invention described in more detail hereinbelow, the control means is operative, when the key or tag is not received by the key reception means, to disable the use of a light or lights and an electrical power outlet or power outlets in the room; and to control an air conditioner so that it can only operate in a minimum power consumption mode. Specifically, the air conditioner is switched from control by a normal room thermostat to control by a standby thermostat providing more economical operation, and a manual control means enabling selection of a blower speed is bypassed so that the blower can only operate at its lower or lowest speed.

The control means preferably includes switching means which are energized when the key or key tag is not received by the key reception means. This feature renders the arrangement 'fail-safe' in that if the switching means fails it will adopt the condition it normally adopts when the key or key tag is received by the key reception means, whereby a person wishing to use the equipment in the room is not inconvenienced. The switching means may take a variety of forms, e.g. one or more electromechanical relays, solid state relays, hybrid relays, solid state switching devices and so forth.

The key reception means also may take a variety of forms. For instance, it may comprise a photo-electric device, a mechanical switch, or a magnetic card reception device. The key reception means may even have a coding provision so that it will only respond to one or more particular keys or tags. In the preferred embodiment, the key reception means comprises a magnetic switch in the form of a reed contact unit and a magnet arranged in the vicinity of the reed contact unit to cause the unit to adopt a particular state (e.g. to close the unit), the arrangement being such that a ferromagnetic key or key tag can be inserted between the magnet and reed contact unit to screen the latter from the former and allow the unit to change state (e.g. open).

BRIEF DESCRIPTION OF THE DRAWINGS

The invention will now be further described, by way of illustrative and non-limiting example, with reference to the accompanying drawings, in which.

DETAILED DESCRIPTION

Figure 1:
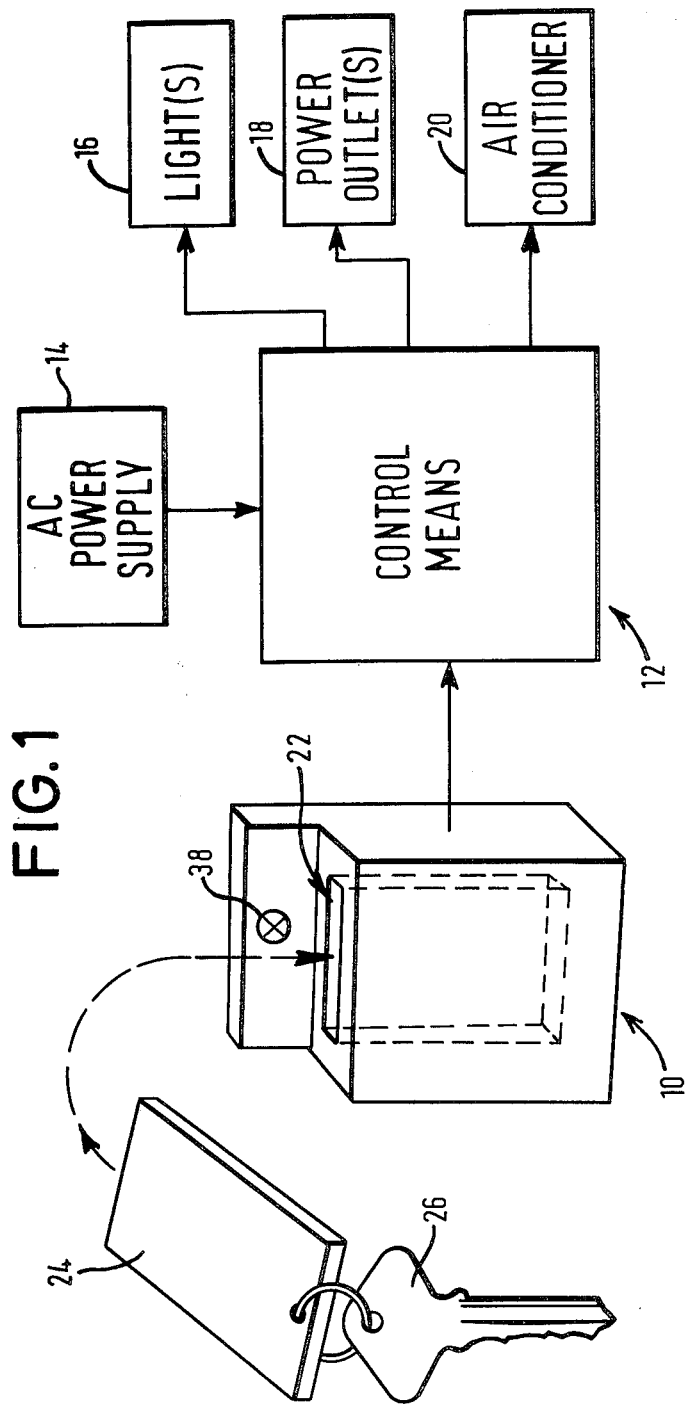
FIG. 1 is a block schematic view of an energy conservation arrangement embodying the invention.

FIG. 1 is a block schematic view of an energy conservation arrangement which is particularly intended for use in a guest room of a hotel. (The arrangement can however, be used in any other lockable room, for example in a public building, office, school, laboratory and so forth.) Preferably, a respective such arrangement is installed in each guest room of the hotel.

The illustrated energy conservation arrangement comprises a key reception module 10 which is installed within the room, preferably near the door. The illustrated arrangement further comprises a control means 12 which is connected to the key reception module 10 and which is preferably disposed and/or arranged so that the guest does not have access to it. The control means 12 is further connected to an AC power supply 14 (e.g., as shown, a 230 V supply), to one or more lights 16 provided in the room, to one or more power outlets 18 provided in the room, and to an air conditioner 20 installed in the room.

The key reception module 10 incorporates a rectangular slot 22 designed to accommodate a ferromagnetic tag 24 of the room key 26. The tag 24 may be a conventional key tag modified to contain a ferromagnetic plate or the like which acts as a magnetic screen. As is explained in more detail hereinbelow, when the tag 24 is inserted in the slot 22 the control means is operative to fully enable operation of the light or lights 16, the power outlet or outlets 18 and the air conditioner 20. When, on the other hand, the tag 24 is not inserted in the slot 22, the control means 12 disables operation of the light(s) 16 and power outlet(s) 18 and only enables operation of the air conditioner 20 in a minimum consumption low-power mode.

Figure 2:
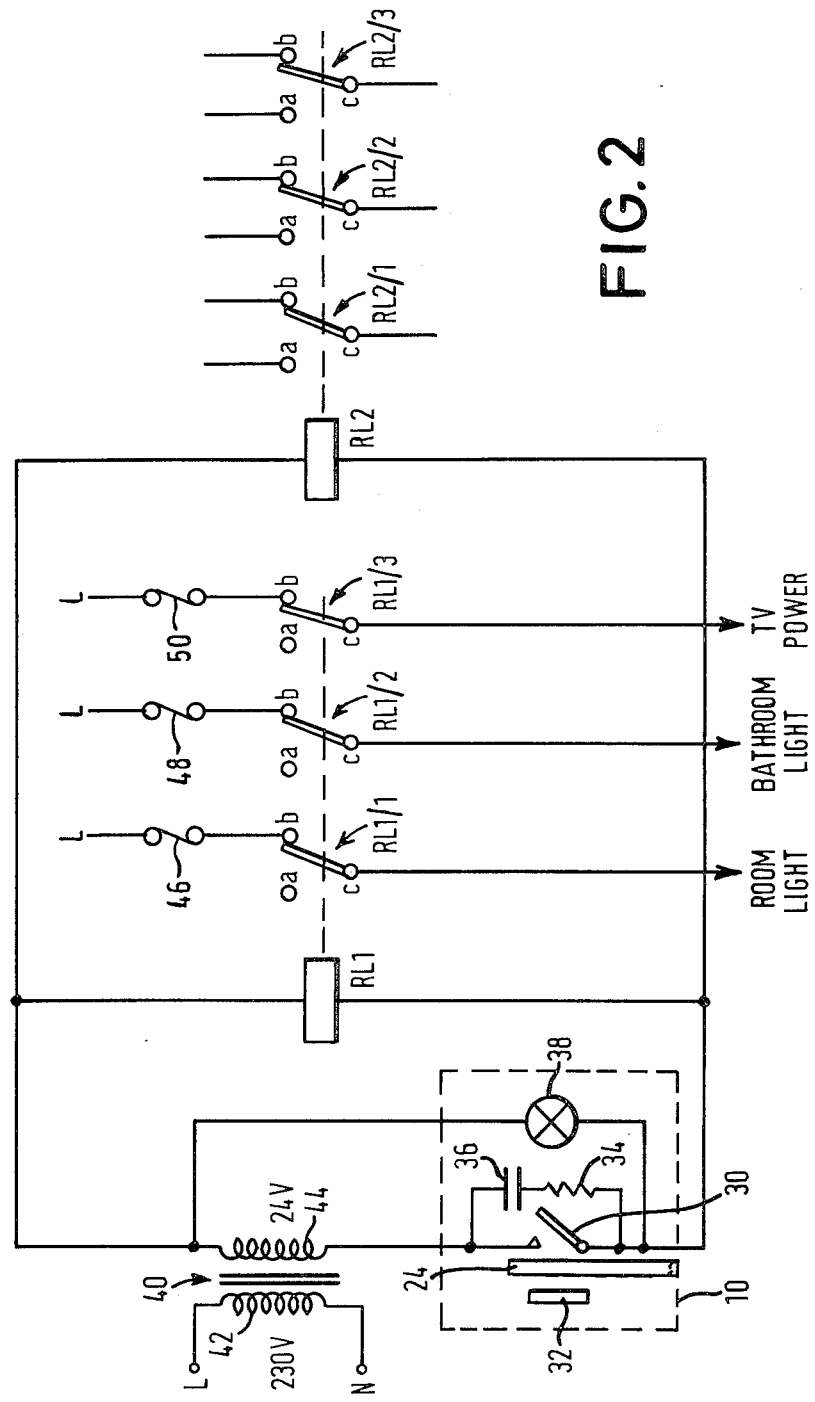
FIG. 2 is a circuit diagram of part of the arrangement of FIG. 1, showing a key reception module and part of a control means operated by the key reception module.

As can be seen from FIG. 2, the key reception module 10 comprises a reed contact unit 30 having a magnet 32 disposed in the vicinity thereof such that, when the tag 24 is not received in the slot 22, the magnet 32 holds the reed contact unit closed. When the tag 24 is received in the slot 22, the tag is disposed between the magnet 32 and the reed contact unit 30, whereby the latter is screened from the former and, as shown in FIG. 2, the reed contact unit 30 becomes open.

The key reception module 10 further comprises a resistor 34 and capacitor 36 connected, as shown, across the contacts of the reed contact unit 30 to suppress arcing. The module 10 further comprises a lamp 38, connected as shown.

FIG. 2 also shows a transformer 40 having a primary winding connected to the live (L) and neutral (N) terminals of the AC power supply 14 and having a secondary winding 44 that develops a low, safe voltage, e.g. 24 V. The secondary winding 44 and the reed contact unit 30 are connected in series with each other and with the parallel combination of a pair of relay coils RL1 and RL2. The relay coil RL1 has three associated contact sets RL1/1, RL1/2, and RL1/3. The relay coil RL2 has three associated contacts sets RL2/1, RL2/2 and RL2/3. Each of the six contact sets comprises three contacts a, b, c.

The contacts a of each of the contact sets RL1/1, RL1/2 and RL1/3 are unconnected. The contacts b of the contact sets RL1/1, RL1/2 and RL1/3 are connected via respective fuses 46, 48 and 50 to the live (L) terminal of the AC power supply 14. The contact c of the contact set RL1/1 is connected to a room light via a conventional switch (not shown). The contact c of the contact set RL1/2 is connected to a bathroom light via a conventional switch (not shown). The contact c of the contact set RL1/3 is connected to a TV power outlet and/or to one or more other power outlets in the room.

Figure 3:
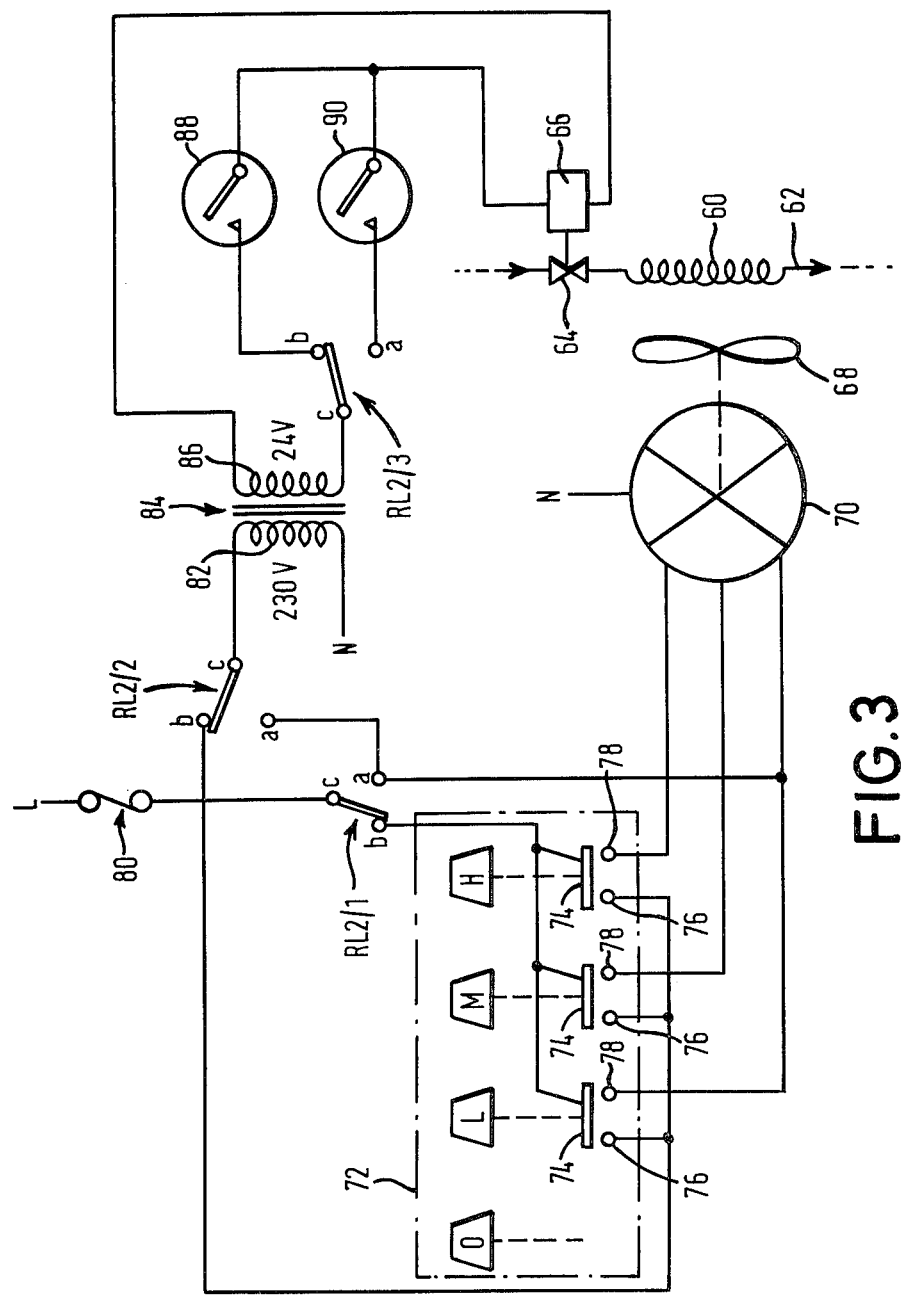
FIG. 3 is a circuit diagram of the remainder of the control means.

The contact sets of the relay RL2 are all associated with the operation of the air conditioner 20 and the manner in which the contacts thereof are connected is shown in FIG. 3, which will be described hereinbelow.

As mentioned above, when the key tag 24 is not disposed in the slot 22 the reed contact unit 30 is closed. Accordingly, the relay coils RL1 and RL2 are energised, and the lamp 38 is illuminated, by means of the 24 V AC supply provided by the secondary 44 of the transformer 40. When the relay coils RL1 and RL2 are energised, the movable contacts of the respective contact sets thereof are in the opposite position to that illustrated, i.e. for each contact set the contact c makes with the contact a. Consequently, as is evident from a consideration of the contact sets RL1/1 to RL1/3, the room light, bathroom light and TV power and/or other power outlets are disconnected from the AC power supply whereby none of them can be operated when the guest is not in his room so that electrical energy is conserved.

When the guest enters the room he inserts the tag 24 of his room key 26 into the slot 22 of the key reception module (the illuminated lamp 38 helps the guest find the slot, particularly in the dark) whereupon the lights and power outlets can be used, the lamp 38 is no longer illuminated, and, as explained hereinbelow, the air conditioner 20 is switched from the low-power consumption mode to full normal operation.

FIG. 3 shows other parts of the circuitry of the energy conservation arrangement and also shows, in block diagram form, components of the air conditioner 20. The air conditioner 20 includes a heat exchanger coil 60 connected in a chilled water supply line 62. Flow of the chilled water through the heat exchange coil 60 is controlled by a valve 64 which can be opened and closed by a solenoid 66. A fan 68 is arranged to blow air past or through the heat exchange coil 60 whereby air within the room is circulated past or through the coil 60 and cooled. The fan 68 is driven by a motor 70 having high, medium and low speed windings. Energization of the respective windings of the motor 70 to cause the fan 68 to rotate at high, medium or slow speed is accomplished by means of a manual fan control assembly 72. The assembly 72 can be of any of a variety of forms known in the art, for example a rotary switch. However, in the preferred embodiment, the assembly 72 is a push-button assembly, which is known per se. The push-button assembly 72 comprises four push-buttons designated O (off), L (low), M (medium) and H (high). Each of the buttons L, M, H is connected to a respective contact bridge 74 which, when depressed, bridges an associated pair of contacts 76, 78. In a manner known in the art, depression of any one of the buttons L, M, and H causes any other one of the three buttons that was previously depressed to become raised, whereby only one of the sets of contacts 76, 78 can be bridged at any one time. Further, again in a manner known in the art, depression of the button O causes retraction of any of the buttons L, M and H that was previously depressed.

The three contact bridges 74 are connected together and are connected, as shown, via the relay contact set RL2/1 and a fuse 80 (forming part of the existing electrical wiring installation) to the live terminal L of the AC power supply 14. The three contacts 78 are connected to respective ones of the low, medium and high speed windings of the fan motor 70. The three contacts 76 are connected together and are connected, as shown, via the relay contact set RL2/2, to one end of a primary winding 82 of a transformer 84, the other end of the primary winding 82 being connected to the neutral (N) terminal of the AC power supply.

One end of a 24 V secondary winding 86 of the transformer 84 is connected to one end of the solenoid 66. The other end of the solenoid 66 is connected to each of a pair of room thermostats 88, 90. The thermostat 88 is the usual room thermostat adjustable by the person occupying the room. The other thermostat 90 is pre-set (possibly adjustably) to operate at a fixed temperature which is generally higher (for a cooling system) than that to which the adjustable thermostat 88 will normally be set, and is not under the control of the person using the room. The thermostats 88, 90 are selectively connectable via the relay contact set RL2/3 to the other end of the secondary winding 86 of the transformer 84.

The way in which the circuitry shown in FIG. 3 operates will now be described. In FIG. 3, as in FIG. 2, all of the contact sets RL2/1 to RL2/3 of the relay coil RL2 are shown in the position they adopt when the relay coil RL2 is not energised, i.e. when the key tag 24 is inserted in the slot 22 of the key reception module 10. In this condition, the valve 64 enabling the flow of chilled water through the heat exchange coil 60 is under the control of the user-adjustable room thermostat 88. Further, depression of any of the buttons L, M and H of the push-button assembly 72 will cause the AC supply voltage to be supplied via the contact set RL2/1 to the associated winding of the motor 70 to rotate the fan 68 at low, medium or high speed, and, via the relay contact set RL2/2, to the transformer 84 whereby a 24 V voltage for operating the solenoid 66 is developed across the secondary winding 86 of the transformer 84.

When the key tag 24 is removed from the slot 22 in the key reception module 10, the relay contact sets RL2/1 to RL2/3 switch over from the illustrated positions so that, in each case, the contact c makes with the contact a rather than the contact b. The consequences of this are as follows. Firstly, the switching over of the contact set RL2/3 provides that the valve 64 is under the control of the preset non-user adjustable thermostat 90, whereby the air conditioner 20 cuts in at a higher temperature and the energy (e.g. gas or electricity) used in cooling the chilled water supply is conserved. Secondly, the switching over of the contact set RL2/1 altogether by-passes the manual control push-button assembly 72, rendering it inoperative, the AC supply voltage being supplied directly to the low speed winding of the fan motor 70, whereby energy is further conserved. Thirdly, the switching over of the contact set RL2/2 connects the AC supply voltage, present on the contact a of the relay set RL2/1, to the primary winding 82 of the transformer 84, whereby the transformer secondary winding 86 develops the 24 V for operating the solenoid 66. In summary, when the key tag 24 is removed from the slot 22 in the key reception module 10, the air conditioner 10 is caused to cut in at a relatively high, preselected temperature (e.g. 27° to 28° C.) and the fan 68 can be rotated only at its lowest speed, regardless of which of the buttons L, M and H of the push-button assembly 72 is depressed.

An advantageous feature of the arrangement disclosed above is that it can readily be installed in an existing hotel room or the like without any alteration or at least without any substantial alternation to the existing electrical wiring, structure and decoration. The system is inexpensive and can soon pay for itself by saving from energy bills, after which it continues to save money. The use of a low (e.g. 24 V) power supply in user-accessible components of the system makes it safe. The system is also 'fail-safe' in the sense that, if either of the relay coils RL1 and RL2 fails so that it cannot be energised, this will not inconvenience the user since the associated part of the circuitry will simply adopt the condition that it would adopt if the key tag 24 were present in the slot 22 in the key reception module 10. The arrangement should increase the life of electrical appliances and bulbs, since they cannot be left energised when the guest leaves the room. Further, the guest should never misplace his key in the room, since the key will normally be accommodated in the key reception module 10 when the guest is in the room. The guest does not have to be educated or persuaded to conserve energy, since the energy conservation function is accomplished immediately and automatically when the guest removes the key from the key reception module 10 when he leaves his room.

The invention may, of course, be embodied in other ways than that described above by way of illustrative example. For example, the system described above was designed for use in hot climates, whereby the air conditioner 20 is a cooling system. However, the system could readily be adapted for use with an air conditioner which provides heating and cooling or heating only. Naturally, if the air conditioner is a heating system, then to conserve energy the preset thermostat 90 will operate at a temperature which is lower rather than higher than the usual setting of the user-adjustable thermostat 88.

A feature of the structure shown in FIG. 3 is that the low speed winding of the fan motor 70 is always energised when the key tag 24 is removed from the key reception module 10. This is often a desirable feature in hot climates since it ensures that the air conditioner 20 provides a certain amount of cooling when the room is not in use, whereby the room does not become excessively warm. However, it may be that in certain times of the year (cool season) this feature is not needed. In this case, the structure of FIG. 3 could be modified, e.g. by the provision of an extra switch, so that during the cool season the low speed winding of the fan motor 70 is not continuously energised when the key tag 24 is removed from the key reception module 10.

The transformer 84 in FIG. 3 provides a low voltage of 24 V to the user-accessible thermostat 88 (and also to the other thermostat 90 and the solenoid 66) to prevent harm to someone removing the thermostat cover. If this feature is not required, i.e. if the thermostat 88 is designed to operate at the full supply voltage, the transformer is not needed. Instead, the contacts c of the relay sets RL2/2 and RL2/3 are connected together and the lower end of the solenoid 66 is connected to the supply neutral terminal N.

Although the preferred arrangement described above is actuated by reception of a tag of a key, it is within the scope of the invention for the arrangement to be actuated by the key itself. In this case, the key or part thereof takes over the above-described function of the tag.

I claim:

1. An energy conservation arrangement for a room lockable by means of a key, the arrangement comprising key reception means located or capable of being located in said room and capable of receiving said key or a tag of the key, said key reception means being operative to indicate whether or not said key or tag is received thereby, and control means responsive to said indication provided by said key reception means to fully enable operation of power-consuming equipment in said room when said key or tag is received by said key reception means and to limit the operation of said equipment when said key reception means, said control means being also operative, when said key or tag is not received by said key reception means, to control an air conditioner so that it can operate in a minimum power consumption mode and to by-pass a manual control means enabling selection of the speed of a blower of said air conditioner and to enable said blower to operate at its lower or lowest speed.

2. An arrangement according to claim 1, wherein said control means is operative, when said key or tag is not received by said key reception means, to disable the use of at least one light in said room.

3. An arrangement according to claim 1, wherein said control means is operative, when said key or tag is not received by said key reception means, to disable the use of at least one electrical power outlet in said room.

4. An arrangement according to claim 1, wherein said control means is operative, when said key is not received by said key reception means, to switch said air conditioner from control by a first room thermostat to control by a second thermostat providing more economical operation.

5. An arrangement according to claim 1, wherein said control means includes switching means arranged to be energised when said key or tag is not received by said key reception means, whereby if the switching means fails it will adopt the condition it adopts when said key or tag is received by said key reception means.

6. An arrangement according to claim 1, wherein said key reception means comprises a magnetic switch.

7. An arrangement according to claim 6, wherein said magnetic switch comprises a reed contact unit and a magnet arranged in the vicinity of said reed contact unit to cause said unit to adopt a first state, the arrangement being such that a ferromagnetic key or key tag can be inserted between said magnet and said reed contact unit to screen the latter from the former and allow the contact unit to change state.

* * * * *